United States Patent
Kim et al.

(10) Patent No.: US 7,876,581 B2
(45) Date of Patent: Jan. 25, 2011

(54) POWER CONVERTER TRANSFORMER FOR SUPPRESSING CONDUCTION EMI AND POWER SUPPLY HAVING ITS TRANSFORMER

(75) Inventors: Jong Hae Kim, Suwon-si (KR); Dong Seong Oh, Incheon-si (KR); Dea Min Jang, Anyang-si (KR); Jin Wook Kim, Seoul (KR); Il Woon Lee, Suwon-si (KR); Jae Sun Won, Suwon-si (KR); Erlan Dzhunusbekov, Suwon-si (KR); Dmitry Berdnikov, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 131 days.

(21) Appl. No.: 12/407,081

(22) Filed: Mar. 19, 2009

(65) Prior Publication Data

US 2010/0202160 A1     Aug. 12, 2010

(30) Foreign Application Priority Data

Feb. 12, 2009   (KR) ...................... 10-2009-0011387

(51) Int. Cl.
*H02M 3/335* (2006.01)
(52) U.S. Cl. .......................... 363/16; 363/18
(58) Field of Classification Search ................ 363/16, 363/18, 19, 20, 21.01, 21.02, 101
See application file for complete search history.

(56) References Cited

U.S. PATENT DOCUMENTS

| 5,724,236 | A | 3/1998 | Oglesbee |
| 2003/0002300 | A1* | 1/2003 | Nakamura ............... 363/21.01 |
| 2004/0240236 | A1* | 12/2004 | Lanni ......................... 363/39 |
| 2005/0002206 | A1* | 1/2005 | Park .......................... 363/16 |

FOREIGN PATENT DOCUMENTS

KR    1020040014972 A    2/2004

* cited by examiner

*Primary Examiner*—Bao Q Vu
*Assistant Examiner*—Nguyen Tran
(74) *Attorney, Agent, or Firm*—Lowe, Hauptman, Ham & Berner

(57) ABSTRACT

In accordance with the present invention, a power converter transformer for suppressing conduction EMI (ElectroMagnetic Interference) includes a primary winding positioned at a primary side; a secondary winding positioned at a second side and coupled with the primary winding; a parasitic capacitor connected between one end of the primary winding and one end of the secondary winding; a switching unit connected to the other end of the primary winding; a Y-capacitor connected between the switching unit and a ground terminal; an auxiliary winding positioned at the secondary side and coupled with the secondary winding; and an auxiliary capacitor connected between the one end of the primary winding and the auxiliary winding.

7 Claims, 4 Drawing Sheets

[FIG. 1]
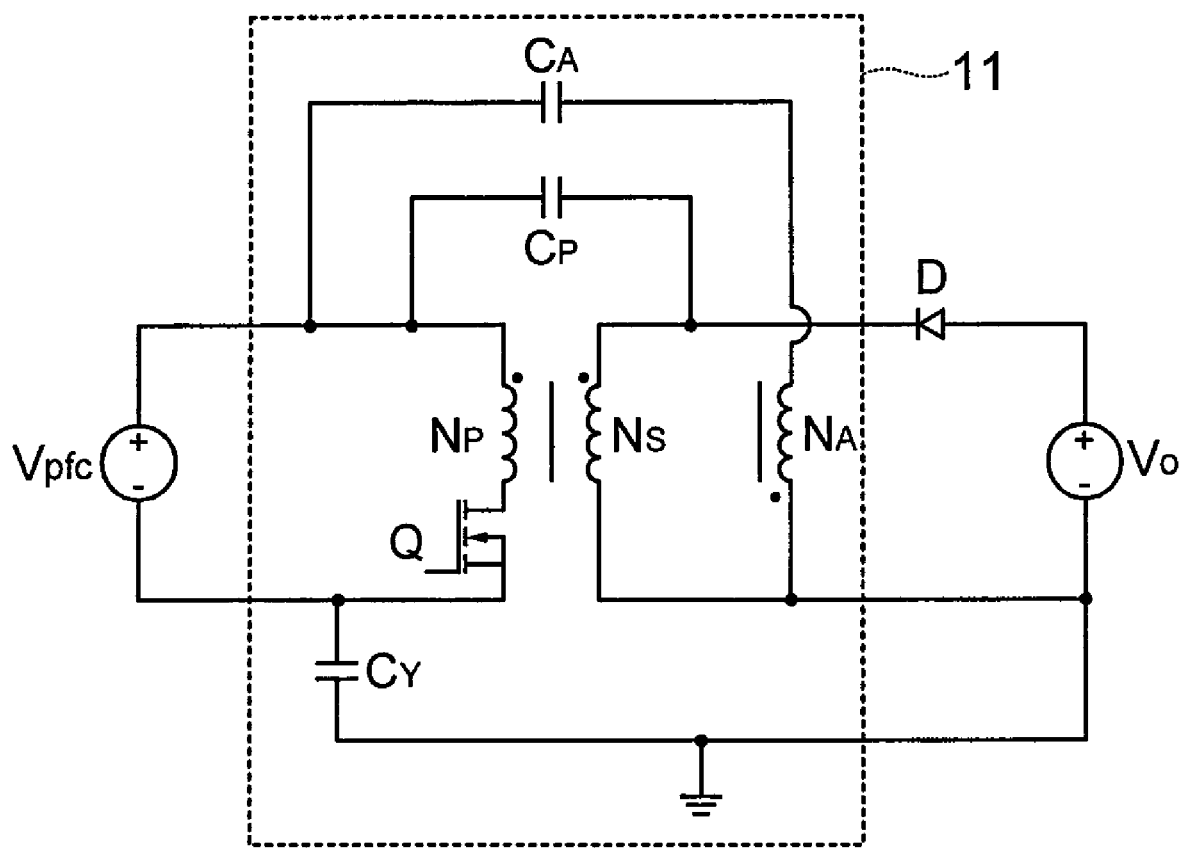
[FIG. 2]
11
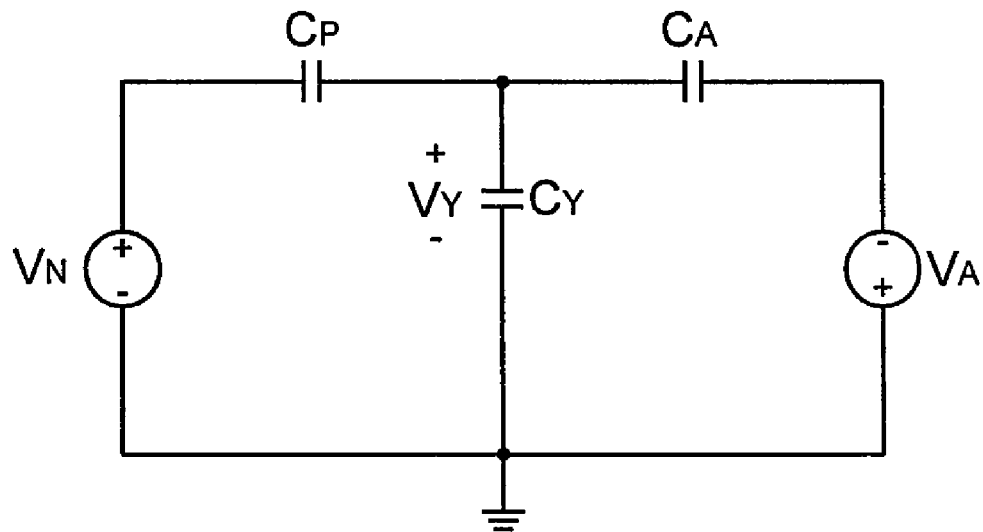

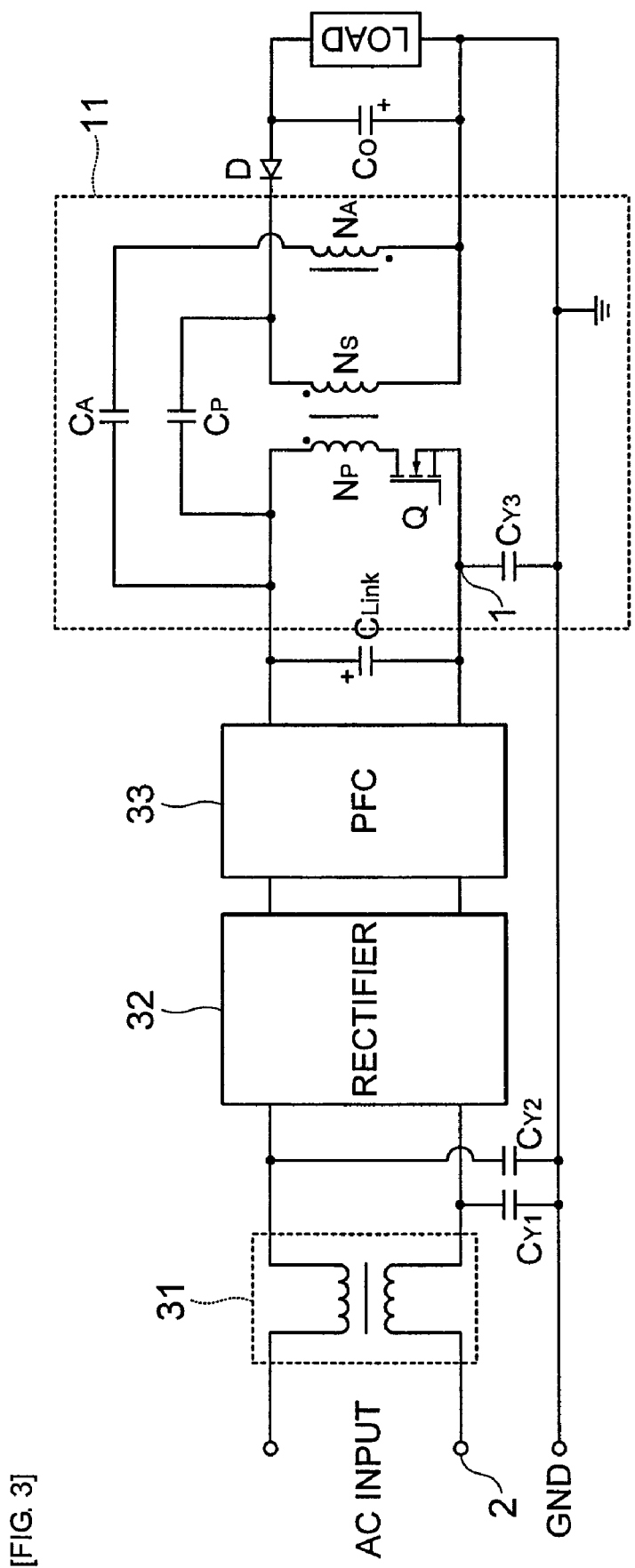
[FIG. 3]

[FIG. 4A]
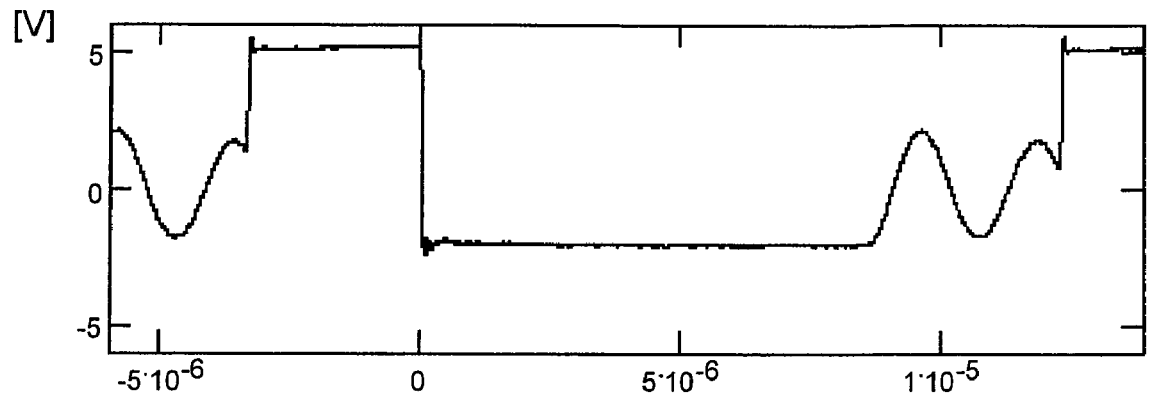
[FIG. 4B]
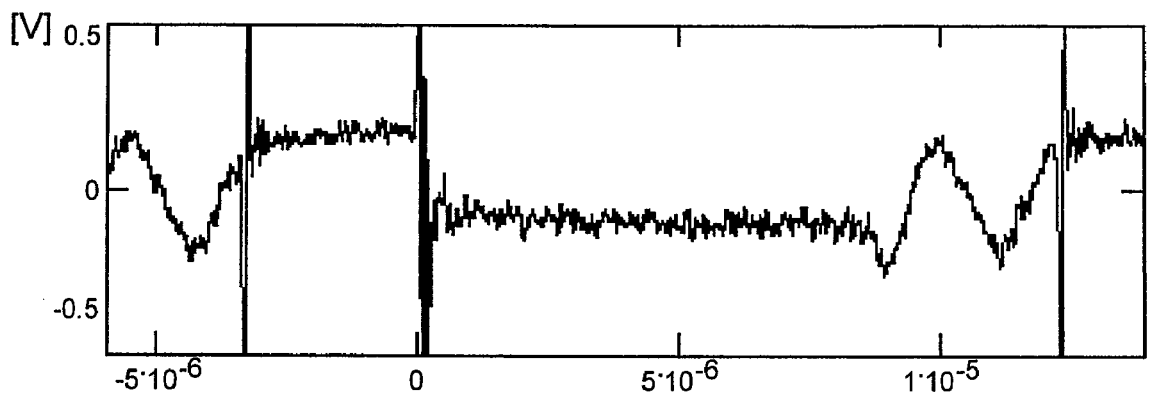
[FIG. 4C]
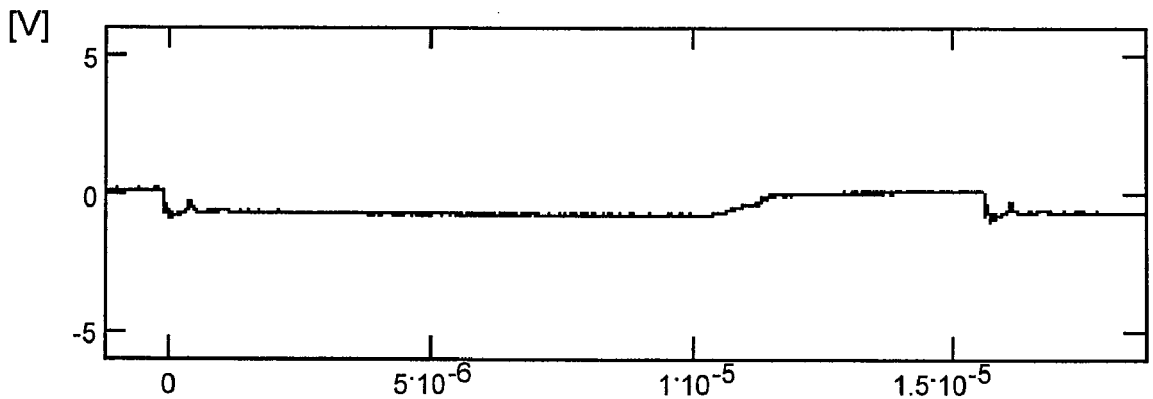

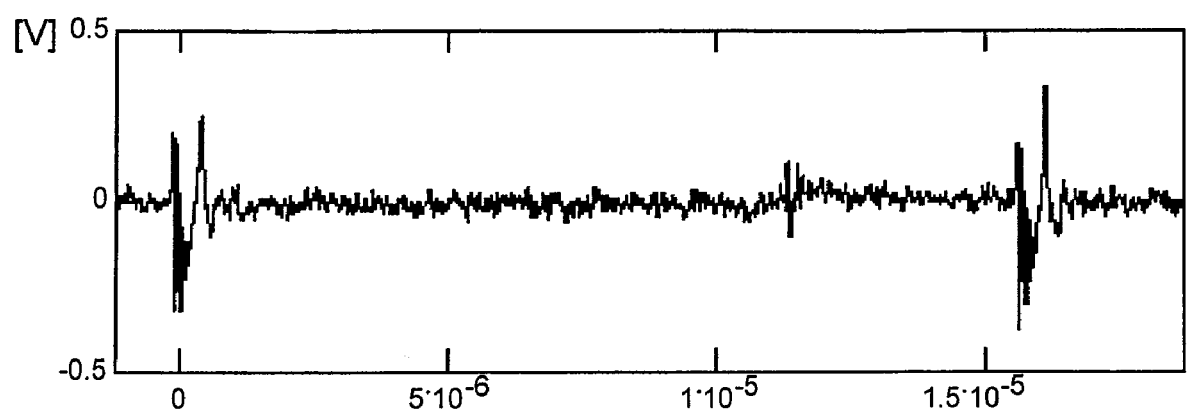
[FIG. 4D]

POWER CONVERTER TRANSFORMER FOR SUPPRESSING CONDUCTION EMI AND POWER SUPPLY HAVING ITS TRANSFORMER

CROSS-REFERENCE TO RELATED APPLICATIONS

This application claims the benefit of Korean Patent Application No. 10-2009-0011387 filed with the Korea Intellectual Property Office on Feb. 12, 2009, the disclosure of which is incorporated herein by reference.

BACKGROUND OF THE INVENTION

1. Field of the Invention

The present invention relates to a power converter transformer for suppressing conduction EMI and a power supply having its transformer; and, more particularly, to a power converter transformer having an auxiliary winding and an auxiliary capacitor to suppress conduction EMI at a secondary side, and a power supply having its transformer.

2. Description of the Related Art

Generally, a power supply has a parasitic path between a primary side and a secondary side of a transformer which is mounted on a PCB (Printed Circuit Board).

The parasitic path increases conduction EMI (ElectroMagnetic Interference) by generating a parasitic noise signal.

Due to the increase of the conduction EMI, efficiency of the power supply is deteriorated. Therefore, studies for suppressing the conduction EMI have been being progressed actively.

SUMMARY OF THE INVENTION

An object of the present invention is to provide a power converter transformer having an auxiliary winding and an auxiliary capacitor in order to suppress conduction EMI at a secondary side, and a power supply having its transformer.

In accordance with one aspect of the present invention, there is provided a power converter transformer for suppressing conduction EMI (ElectroMagnetic Interference) including: a primary winding positioned at a primary side; a secondary winding positioned at a second side and coupled with the primary winding; a parasitic capacitor connected between one end of the primary winding and one end of the secondary winding; a switching unit connected to the other end of the primary winding; a Y-capacitor connected between the switching unit and a ground terminal; an auxiliary winding positioned at the secondary side and coupled with the secondary winding; and an auxiliary capacitor connected between the one end of the primary winding and the auxiliary winding.

In accordance with another aspect of the present invention, there is provided a power supply including: an AC input power source; an input choke connected to the AC input power source; a rectifier connected to the input choke; a PFC (Power Factor Correction) unit connected to the rectifier; a power converter transformer connected to the PFC unit; and a rectification unit connected to the power converter transformer, wherein the power converter transformer includes a primary winding positioned at a primary side; a secondary winding positioned at a second side and coupled with the primary winding; a parasitic capacitor connected between one end of the primary winding and one end of the secondary winding; a switching unit connected to the other end of the primary winding; a Y-capacitor connected between the switching unit and a ground terminal; an auxiliary winding positioned at the secondary side and coupled with the secondary winding; and an auxiliary capacitor connected between the one end of the primary winding and the auxiliary winding.

In accordance with the present invention, the primary winding, the secondary winding, and the auxiliary winding have polarities, respectively and the auxiliary winding may have a polarity opposite to that of the secondary winding.

In accordance with the present invention, the switching unit may be a transistor.

In accordance with the present invention, the rectification unit may include a diode or a synchronous rectifier.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram of a power converter transformer for suppressing conduction EMI in accordance with the present invention;

FIG. 2 is an equivalent circuit diagram of FIG. 1;

FIG. 3 is a circuit diagram of a power supply in accordance with the present invention; and FIGS. 4a-4d are graphs showing voltage waveforms at first and second terminals shown in FIG. 3 before and after addition of an auxiliary winding and an auxiliary capacitor.

DETAILED DESCRIPTION OF THE PREFERABLE EMBODIMENTS

The present invention may include several embodiments through various modifications, wherein specific embodiments are exemplified in the accompanying drawings and will be explained in detail. However, it should be understood that the present invention is not limited to the specific embodiments and includes all modifications, equivalents and substitutions falling within the spirit and technical scope of the present invention. In description of the present invention, if it is determined that the gist of the present invention becomes vague due to detailed description of related published techniques, the detailed description thereof will be omitted.

Although terms such as "first" and "second" may be used in order to describe a diversity of components, the components should not be limited by the terms. The terms are used only to distinguish one component from the other components.

The terms of this application are used only to describe the specific embodiments, but they are not aimed at limiting the present invention. A singular form includes a plural form as long as the singular form does not clearly indicate a different thing from the plural form. It should be understood that in this application, terms such as "include" or "have" specify existence of a characteristic, a figure, a step, an operation, a component, a part or a combination thereof which are described in the specification but do not previously exclude existence or possibility of addition of one or more different characteristics, figures, steps, operations, components, parts or combinations thereof.

Hereinafter, embodiments of a power converter transformer for suppressing conduction EMI (ElectroMagnetic Interference) and a power supply having its transformer in accordance with the present invention will be described in detail with reference to the accompanying drawings. In describing them with reference to the accompanying drawings, the same or corresponding component will be represented by the same reference numeral and repeated description thereof will be omitted.

FIG. 1 is a circuit diagram of a power converter transformer for suppressing conduction EMI in accordance with the present invention.

Referring to FIG. 1, a power converter transformer 11 for suppressing conduction EMI in accordance with the present invention includes a primary winding $N_P$, a secondary winding $N_S$, a parasitic capacitor $C_P$, a switching unit Q, a Y-capacitor $C_Y$, an auxiliary winding $N_A$, and an auxiliary capacitor $C_A$.

The primary winding $N_P$ is positioned at a primary side of the transformer and the secondary winding $N_S$ is positioned at a secondary side of the transformer to be coupled with the primary winding $N_P$. Further, the primary winding $N_P$ and the secondary winding $N_S$ may have polarities, respectively. It is preferable that the primary winding $N_P$ and the secondary winding $N_S$ may have the same polarity.

The parasitic capacitor $C_P$ is positioned on a parasitic path which is formed between the primary side and the secondary side of the transformer mounted on a PCB (Printed Circuit Board). That is, it may be connected between one end of the primary winding $N_P$ and one end of the secondary winding $N_S$.

The parasitic capacitor $C_P$ increases conduction EMI by generating parasitic noise.

The switching unit Q may be connected to the other end of the primary winding $N_P$. The switching unit Q may be a transistor and can perform PWM (Pulse Width Modulation) control by receiving a feedback output signal.

The Y-capacitor $C_Y$ can reduce noise of the transformer by being connected between the switching unit Q and a ground terminal.

The auxiliary winding $N_A$ is positioned at the secondary side of the transformer and coupled with the secondary winding $N_S$. Further, the auxiliary winding $N_A$ has a polarity. At this time, it may have a polarity opposite to that of the secondary winding $N_S$ in order to generate compensation noise which has the same size as the parasitic noise generated by the parasitic capacitor $C_P$ and has a phase opposite to that of the parasitic noise.

The auxiliary capacitor $C_A$ may be connected between the one end of the primary winding $N_P$ and the auxiliary winding $N_A$. Although the compensation noise generated by the auxiliary winding $N_A$ should have the same size as the parasitic noise and have the phase opposite to that of the parasitic noise, practically, the size is not exactly equal due to the parasitic path according to the auxiliary winding $N_A$ or the like. At this time, the size of the compensation noise according to the auxiliary winding $N_A$ can become all the more equal to the size of the parasitic noise by connecting the auxiliary capacitor $C_A$.

In other words, the present invention can achieve suppression of the conduction EMI that is the object of the present invention by generating the compensation noise which has the same size as the parasitic noise generated by the parasitic capacitor $C_P$ connected between the one end of the primary winding $N_P$ and the one end of the secondary winding $N_S$ of the transformer mounted on the PCB, and has the phase opposite to that of the parasitic noise through the auxiliary winding $N_A$ and the auxiliary capacitor $C_A$.

This is described in more detail with reference to FIG. 2 hereinafter.

FIG. 2 is an equivalent circuit diagram of FIG. 1.

Referring to FIG. 2, $V_N$ is a voltage between both ends of the secondary winding $N_S$ coupled with the primary winding $N_P$ as shown from the secondary side, $V_A$ is a voltage between both ends of the auxiliary winding $N_A$, and $V_Y$ is a voltage between both ends of the Y-capacitor $C_Y$.

At this time, the voltage $V_Y$ between the both ends of the Y-capacitor $C_Y$ should be 0 so that the compensation noise generated by the auxiliary winding $N_A$ and the auxiliary capacitor $C_A$ compensates for the parasitic noise. The equation for the voltage $V_Y$ between the both ends of the Y-capacitor $C_Y$ obtained by applying Kirchhoff's current law, is expressed as the following equation 1.

$$V_Y = V_N \cdot \frac{C_P}{C_Y + C_P + C_A} - V_A \cdot \frac{C_A}{C_Y + C_P + C_A} = 0 \quad \text{[Equation 1]}$$

Further, a relation between the voltage $V_N$ between the both ends of the secondary winding $N_S$ coupled with the primary winding $N_P$ as shown from the secondary side, and the voltage $V_A$ between the both ends of the auxiliary winding $N_A$, is expressed as the following equation 2.

$$V_A = (N_A/N_N) \cdot V_N \quad \text{[Equation 2]}$$

Herein, the $N_A$ represents the winding number of the auxiliary winding and the $N_N$ represents the winding number of the secondary winding coupled with the primary winding as shown from the secondary side.

Therefore, compensation of the parasitic noise can be achieved by properly adjusting the value of the auxiliary capacitor $C_A$ and the winding number of the auxiliary winding $N_A$.

FIG. 3 is a circuit diagram of a power supply in accordance with the present invention and FIG. 4 is a graph showing voltage waveforms at first and second terminals shown in FIG. 3 before and after addition of the auxiliary winding and the auxiliary capacitor.

Referring to FIG. 3, a power supply in accordance with the present invention includes an AC input power source, an input choke 31 connected to the AC input power source, a rectifier 32 connected to the input choke 31, a PFC (Power Factor Correction) unit 33 connected to the rectifier, a power converter transformer 11 connected to the PFC unit, and a rectification unit connected to the power converter transformer 11.

Further, the rectification unit may include a diode D or a synchronous rectifier.

Further, the power converter transformer 11 may include a primary winding $N_P$, a secondary winding $N_S$, a parasitic capacitor $C_P$, a switching unit Q, a Y-capacitor $C_{Y3}$, an auxiliary winding $N_A$, and an auxiliary capacitor $C_A$.

The primary winding $N_P$ is positioned at a primary side of the transformer and the secondary winding $N_S$ is positioned at a secondary side of the transformer to be coupled with the primary winding $N_P$. Further, the primary winding $N_P$ and the secondary winding $N_S$ may have polarities, respectively. It is preferable that the primary winding $N_P$ and the secondary winding $N_S$ may have the same polarity.

The parasitic capacitor $C_P$ is positioned on a parasitic path which is formed between the primary side and the secondary side of the transformer mounted on a PCB (Printed Circuit Board). That is, it may be connected between one end of the primary winding $N_P$ and one end of the secondary winding $N_S$.

The parasitic capacitor $C_P$ increases conduction EMI by generating parasitic noise.

The switching unit Q is connected to the other end of the primary winding $N_P$. The switching unit Q may be a transistor and can perform PWM (Pulse Width Modulation) control by receiving a feedback output signal.

The Y-capacitor $C_{Y3}$ can reduce noise of the transformer by being connected between the switching unit Q and a ground terminal.

The auxiliary winding $N_A$ is positioned at the secondary side of the transformer and coupled with the secondary winding $N_S$. Further, the auxiliary winding $N_A$ has a polarity. At this time, it may have the polarity opposite to that of the secondary winding $N_S$ in order to generate compensation noise which has the same size as the parasitic noise generated by the parasitic capacitor $C_P$ and has a phase opposite to that of the parasitic noise.

The auxiliary capacitor $C_A$ may be connected between the one end of the primary winding $N_P$ and the auxiliary winding $N_A$. Although the compensation noise generated by the auxiliary winding $N_A$ should have the same size as the parasitic noise and have the phase opposite to that of the parasitic noise, practically, the size is not exactly equal due to the parasitic path according to the auxiliary winding $N_A$ or the like. At this time, the size of the compensation noise according to the auxiliary winding $N_A$ can become all the more equal to the size of the parasitic noise by connecting the auxiliary capacitor $C_A$.

Referring to FIG. 4, (a) shows a terminal voltage waveform at a first terminal 1 before addition of the auxiliary winding $N_A$ and the auxiliary capacitor $C_A$, (b) shows a terminal voltage waveform at a second terminal 2 before addition of the auxiliary winding $N_A$ and the auxiliary capacitor $C_A$, (c) shows a terminal voltage waveform at the first terminal 1 after addition of the auxiliary winding $N_A$ and the auxiliary capacitor $C_A$, and (d) shows a terminal voltage waveform at the second terminal 2 after addition of the auxiliary winding $N_A$ and the auxiliary capacitor $C_A$. At this time, terminal voltages correspond to voltages between the ground terminal and each of the terminals 1 and 2.

That is, in case that the auxiliary winding $N_A$ and the auxiliary capacitor $C_A$ are added, each of the terminal voltages is uniform, compared to that before adding them. This means that the parasitic noise is compensated for by the compensation noise through the auxiliary winding $N_A$ and the auxiliary capacitor $C_A$, thereby suppressing the conduction EMI.

As described above, in accordance with the present invention, the conduction EMI can be suppressed by adding the auxiliary winding and the auxiliary capacitor to the power converter transformer.

As described above, although the preferable embodiments of the present invention have been shown and described, it will be appreciated by those skilled in the art that substitutions, modifications and variations may be made in these embodiment without departing from the principles and spirit of the general inventive concept, the scope of which is defined in the appended claims and their equivalents.

What is claimed is:

1. A power converter transformer for suppressing conduction EMI (ElectroMagnetic Interference) comprising:
    a primary winding positioned at a primary side;
    a secondary winding positioned at a second side and coupled with the primary winding;
    a parasitic capacitor connected between one end of the primary winding and one end of the secondary winding;
    a switching unit connected to the other end of the primary winding;
    a Y-capacitor connected between the switching unit and a ground terminal;
    an auxiliary winding positioned at the secondary side and coupled with the secondary winding; and
    an auxiliary capacitor connected between the one end of the primary winding and the auxiliary winding.

2. The power converter transformer for suppressing the conduction EMI of claim 1, wherein the primary winding, the secondary winding, and the auxiliary winding include polarities respectively and the auxiliary winding includes a polarity opposite to a polarity of the secondary winding.

3. The power converter transformer for suppressing the conduction EMI of claim 1, wherein the switching unit is a transistor.

4. A power supply comprising:
    an AC input power source;
    an input choke connected to the AC input power source;
    a rectifier connected to the input choke;
    a PFC (Power Factor Correction) unit connected to the rectifier;
    a power converter transformer connected to the PFC unit; and
    a rectification unit connected to the power converter transformer, wherein the power converter transformer includes:
    a primary winding positioned at a primary side;
    a secondary winding positioned at a second side and coupled with the primary winding;
    a parasitic capacitor connected between one end of the primary winding and one end of the secondary winding;
    a switching unit connected to the other end of the primary winding;
    a Y-capacitor connected between the switching unit and a ground terminal;
    an auxiliary winding positioned at the secondary side and coupled with the secondary winding; and
    an auxiliary capacitor connected between the one end of the primary winding and the auxiliary winding.

5. The power supply of claim 4, wherein the primary winding, the secondary winding, and the auxiliary winding include polarities respectively and the auxiliary winding includes a polarity opposite to a polarity of the secondary winding.

6. The power supply of claim 4, wherein the switching unit is a transistor.

7. The power supply of claim 4, wherein the rectification unit includes a diode or a synchronous rectifier.

* * * * *